United States Patent [19]

Fukuzawa et al.

[11] Patent Number: 4,847,573
[45] Date of Patent: Jul. 11, 1989

[54] OPTICAL MODULATOR

[75] Inventors: Tadashi Fukuzawa, Tokyo; Eizaburo Yamada, Tama; Kenji Hiruma, Koganei; Hiroyoshi Matsumura, Saitama, all of Japan

[73] Assignee: Hitachi, Ltd., Tokyo, Japan

[21] Appl. No.: 860,412

[22] Filed: May 7, 1986

[30] Foreign Application Priority Data

May 10, 1985 [JP] Japan .................. 60-97764

[51] Int. Cl.$^4$ .......................................... H01L 33/00
[52] U.S. Cl. ...................... 332/7.51; 357/17
[58] Field of Search .............. 332/7.51; 357/17, 16; 350/355; 372/50

[56] References Cited

U.S. PATENT DOCUMENTS

| | | | |
|---|---|---|---|
| 4,288,757 | 9/1981 | Kajimura et al. | 357/17 X |
| 4,438,446 | 3/1984 | Tsang | 357/17 |
| 4,518,934 | 5/1985 | Venkatesan | 332/7.51 |
| 4,525,687 | 6/1985 | Chemla et al. | 332/7.51 |
| 4,546,480 | 10/1985 | Burnham et al. | 357/17 X |
| 4,602,370 | 7/1986 | Tsang | 357/17 X |
| 4,607,369 | 8/1986 | Niina et al. | 357/17 X |
| 4,611,328 | 9/1986 | Liu et al. | 357/17 X |

Primary Examiner—Thomas H. Tarcza
Assistant Examiner—Mark Hellner
Attorney, Agent, or Firm—Antonelli, Terry & Wands

[57] ABSTRACT

An optical modulator which utilizes the Stark effect according to which the absorption spectra change if an electric field is applied to the excitons. A thin film of a suitable thickness composed of a semiconductor and an insulator or composed of either one of them, is formed between a group of electrons and a group of positive holes that constitute excitons, so that the excitons are stabilized. The optical modulator performs the modulation at high speeds maintaining a high efficiency.

27 Claims, 3 Drawing Sheets

OPTICAL MODULATOR

BACKGROUND OF THE INVENTION

1. Field of the Invention

The present invention relates to an optical modulator used for optical communications and optical data processing, and more specifically to the structure of an optical modulator which exhibits excellent modulation velocity and modulation efficiency.

2. Prior Art

In a semiconductor superlattice using such semiconductors as GaAs and GaAlAs, the excitons behave like two-dimensional hydrogen atoms due to the quantum size effect. In this case, the Bohr radius is about one-fourth and the binding energy is about four times as great compared with the case when the excitons behave like three-dimensional hydrogen atoms in the semiconductor bulk crystal. Therefore, the excitons that are observed only at low temperatures in the bulk crystal, can be observed in the superlattice structure even at room temperature (see D. A. B. Miller et al "Large Room-Temperature Optical Nonlinearity in GaAs/Ga$_{1-x}$Al$_x$As Multiple Quantum Well Structures", Appl. Phys. Lett. Vol. 41, pp. 679-681, 1982).

If an electric field is applied to the excitons, the absorption spectra change due to the Stark effect. There has been proposed an optical modulator which utilizes this principle (see T. H. Wood et al., "High-Speed Optical Modulation with GaAs/GaAlAs Quantum Wells in a p-i-n Diode Structure", Appl. Phys. Lett. Vol. 44, pp. 16-18, 1984).

FIG. 1 illustrates the structure of a conventional optical modulator, wherein reference numeral 1 denotes an n-type GaAs substrate, 2 denotes an etching stopping layer composed of n-type GaAlAs, 3 denotes an n-type superlattice contact layer, 4 and 6 denote undoped superlattice buffer layers, 5 denotes an undoped superlattice active layer, 7 denotes a p-type superlattice contact layer, 8 denotes a p-type GaAlAs contact layer, 9 denotes an electrode of the n side, and 10 denotes an electrode of the p side.

The incident light (signal light) 11 is modulated as it passes through the undoped superlattice active layer to which a bias voltage is applied, and goes out therefrom as denoted by 12. In this case, the exciton consists of an electron and a positive hole that exist in a quantum well, and is very likely to produce recombination emission and decay. The recombination emission which is overlapped on the signal light deteriorates the signal-to-noise ratio of the optical demodulator. Further, a photocurrent produced by the signal light causes the applied voltage to drop substantially, so that the modulation efficiency decreases.

Methods have also been announced to separate the electrons and the positive holes in real space (see Staggered-Lineup Heterojunctions as Sources of Tunable Below-Gap Radiation: Operating Principle and Semiconductor Selection, IEEE Trans. Vol. Ed-4, pp. 20-22, 1983, and E. J. Caine et al., "Staggered-Lineup Heterojunctions as Sources of Tunable Below-Gap Radiation: Experimental Verification", Appl. Phys. Lett. Vol. 45, pp. 1123-1125, 1984). Even in these cases, however, the electrons and the positive holes are not sufficiently separated, and the above-mentioned defects are not overcome.

FIG. 3 is a diagram of energy bands of these cases. The electron 17 and the positive hole 18 are confined in a triangular potential well formed by the application of a bias voltage 24. However, the electron and the positive hole are likely to recombine as denoted by 19 and 20 due to the tunnel effect, since the barrier is not so high.

SUMMARY OF THE INVENTION

It is an object of the present invention to provide an optical modulator which exhibits stable modulation characteristics, and performs modulation at high speeds maintaining a high efficiency.

The inventors have forwarded the study in connection with stabilizing the excitons, and have discovered the fact that the excitons can be stabilized if a semiconductor and/or an insulator are formed between a group of electrons and a group of positive holes that form excitons.

The inventors have adapted this structure to an optical modulator which has semiconductor superlattice layers such as a contact layer, an optical guide layer, and an active layer formed on a semiconductor substrate.

The present invention makes it possible to stably produce an optical modulator which stably performs the modulation operation at high speeds maintaining a high efficiency. Therefore, the present invention contributes to highly promote the optical data processing technique and optical communications technique.

DETAILED DESCRIPTION OF THE PREFERRED EMBODIMENTS

Embodiment 1

Figure 1:
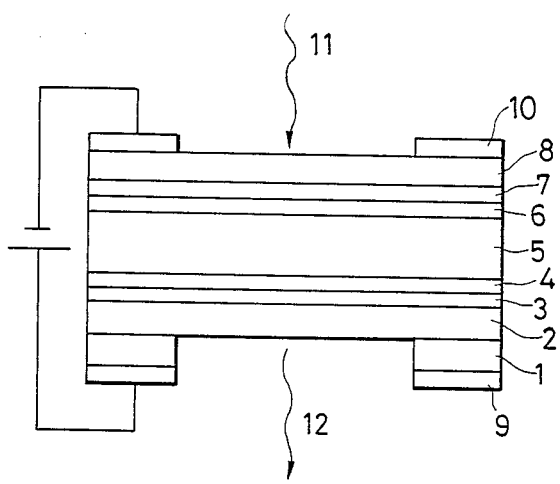
FIG. 1 is a section view showing a conventional optical modulator.

A first embodiment will now be described below in conjunction with FIGS. 2 and 4.

On an n-type GaAs substrate 25 are formed an n-type Ga$_{0.5}$Al$_{0.5}$As cladding layer 26 maintaining a thickness of 2 μm, an n-type Ga$_{0.8}$Al$_{0.2}$As optical guide layer 27 maintaining a thickness of 0.5 μm, an n-type GaAs quantum well layer 28 maintaining a thickness of 0.04 μm, an undoped GaAlAs layer 29 maintaining a thickness of 60 angstroms, a p-type GaAs quantum well layer 30 maintaining a thickness of 0.04 μm, a p-type Ga$_{0.8}$Al$_{0.2}$As optical guide layer 31 maintaining a thickness of 0.5 μm, a p-type Ga$_{0.8}$Al$_{0.2}$As cladding layer 32 maintaining a thickness of 1.5 μm, and a p-type GaAs cap layer 33 maintaining a thickness of 0.2 μm, successively, by the molecular beam epitaxy (MBE) method. Then, a p-side electrode 34 and an n-side electrode 35 are attached.

Figure 4:
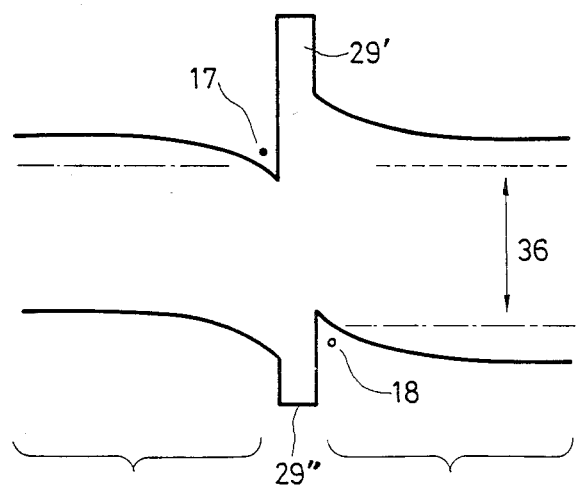
FIG. 4 is an energy band diagram of an element of the first embodiment.

FIG. 4 is a diagram of energy bands when a forward bias voltage 36 is applied to the electrodes 34 and 35. The electron 17 and the positive hole 18 are separated in space by the potentials 29', 29" across the barrier layer 39 which is 60 angstroms thick. Therefore, the recombination by the tunnel effect can be neglected. Further, the coulomb force acts between the electron and the positive hole, so that an exciton is ready to be formed.

Figure 2:
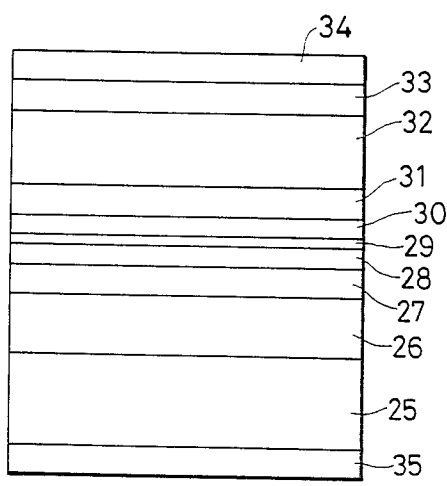
FIG. 2 is a diagram which illustrates a first embodiment.
Figure 3:
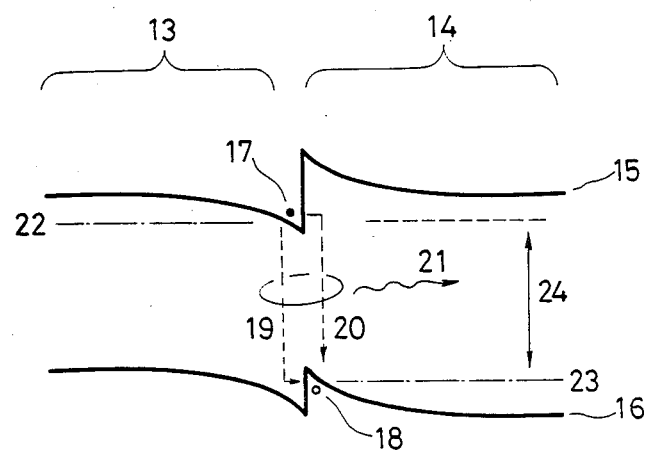
FIG. 3 is a diagram of energy bands by a conventional method.

Referring to FIG. 2, the layers are removed by the reactive ion beam etching method up to the layers 26 to 33, such that the layers 28, 29 and 30 will have a thickness of 10 μm in the direction perpendicular to the surface of the paper. The thus prepared specimen is examined for its optical modulation characteristics. The layers 27 to 31 are irradiated with a semiconductor laser beam which has a wavelength of 840 nm and which is focused into a spot 2 μm in diameter, to thereby guide the beam. A modulation signal of ±0.1 V is overlapped on a DC bias of 2 V to measure the intensity of light that is guided. An optical modulation of a modulation depth of 87% is observed.

Embodiment 2

Figure 5:
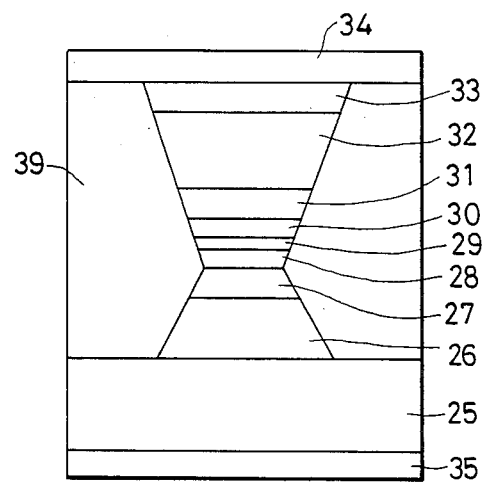
FIG. 5 is a section view of an element of a second embodiment.

A second embodiment will now be described with reference to FIG. 5.

Crystal layers 26 to 33 are formed on an n-type GaAs substrate in the same manner as in the first embodiment, followed by mesa-etching. Due to the selective etching, the layers 27 and 28 can be most narrowed (stripe shaped) as shown in FIG. 5. The narrowest portion (stripe) is 5 μm wide. The above etched portion is then filled with a $Ga_{0.7}Al_{0.3}As$ 39 having a high resistivity by the liquid phase growing method. Then, a p-side electrode 34 and an n-side electrode 35 are formed, followed by the cleavage such that the element will become 10 μm long, to thereby complete an optical modulator element.

A semiconductor laser beam having a wavelength of 850 nm is allowed to be incident on the element, and a bias voltage of 1.6 V on which is overlapped a high-frequency voltage of 30 mV for modulation, is applied across the electrodes 34 and 35, to make sure that the modulation of 15 GHz takes place.

The striped shape produces the effect to confine the light, such that the transverse mode of light is controlled.

Embodiment 3

A third embodiment will be described with reference to FIG. 6.

Figure 6:
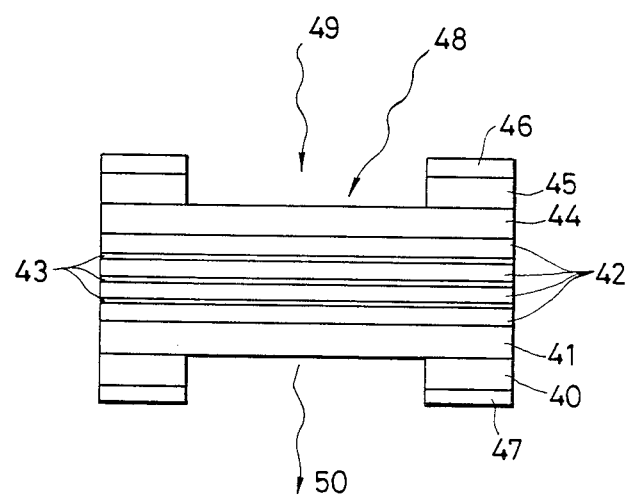
FIG. 6 is a section view of an element of a third embodiment.

On an n-type InP substrate 40 are formed an n-type InP buffer layer 41 maintaining a thickness of 2 μm, four undoped GaInAs well layers 42 each maintaining a thickness of 600 angstroms, three undoped AlInAs barrier layers 43 each maintaining a thickness of 60 angstroms, a p-type InP buffer layer 44 maintaining a thickness of 2 μm, and a p-type InGaAsP cap layer 45 maintaining a thickness of 0.3 μm, as shown in FIG. 6. The layers are formed by the MOCVD method. Ring-like electrodes 46, 47 are then formed. With the ring-like electrodes 46, 47 as masks, the substrate 40 and the cap layer 45 are removed by the chemical etching method to form a window.

The specimen is irradiated with excitation light 48 of a wavelength of 1.3 μm while applying an inverse bias voltage across the electrodes 46 and 47, so that the electrons and the positive holes are induced in the well layers 42. Since the inverse bias voltage has been applied, the electrons and the positive holes migrate in the opposite directions to form electron-hole pairs (excitons) via the barrier layers 43. That is, the electron-hole pairs are formed in three layers. Under this condition, the signal light 49 of a wavelength of 1.5 μm is modulated by high-frequency electric signals of 5 GHz applied across the electrodes 46 and 47, to thereby obtain outgoing light 50.

Each of the barrier layers should have such a thickness that a group of electrons and a group of positive holes recombine via the barrier with a probability of smaller than $10^{-6}$.

Embodiment 4

In the above-mentioned embodiment, if the thickness of the barrier layer becomes smaller than 15 angstroms, its effect decreases and the signal-to-noise ratio decreases. Further, if the thickness of the barrier layer becomes greater than 200 angstroms, the excitons lose the stability and the signal-to-noise ratio decreases, too.

The quantum well layers should have a thickness within a range of 100 to 1000 angstroms each. From the practical point of view such as produceability, however, the barrier layers should have a thick ss of 30 to 100 angstroms each and the quantum well layers should have a thickness of 300 to 700 angstroms each.

Embodiment 5

A variety of optical modulators are prepared by combining quantum well layers composed of $Ga_{0.01}Al_{0.99}As$, $Ga_{0.5}Al_{0.5}As$, $Ga_{0.99}Al_{0.01}As$, $In_{0.01}Ga_{0.99}As$, $In_{0.5}Ga_{0.5}As$ and $In_{0.99}Ga_{0.01}As$ having thicknesses of 100 to 1000 angstroms, and barrier layers composed of GaAs, $Ga_{0.01}Al_{0.99}As$, $Ga_{0.5}Al_{0.5}As$ and $Ga_{0.99}Al_{0.01}As$ having thicknesses of 16 to 199 angstroms, in the same manner as the first embodiment, and are examined for their operation characteristics. The optical modulators all exhibited the modulation speeds of higher than 10 GHz.

Embodiment 6

Optical modulators are prepared by forming a quantum well layer of various compositions of $In_xG_{1-x}As_yP_{1-y}$ ($0<x<1$, $0<y<1$) and forming a barrier layer composed of InP through the same steps as those of the first embodiment. The optical modulators exhibit modulation speeds of 10 to 15 GHz.

Embodiment 7

An optical modulator having a quantum well layer composed of $Ga_{1-x}Al_xAs$ ($0\leq x<1$) and a barrier layer composed of $Ga_{1-y}Al_yAs$ ($0<y\leq 1$) is prepared in the same manner as in the first embodiment. The optical modulator exhibits a modulation speed of 20 GHz when the quantum well layer has a thickness of greater than 200 angstroms and the barrier layer has a thickness of 40 to 100 angstroms. In this case, also, the optical modulator is produced through the same process as that of the first embodiment.

What is claimed is:

1. An optical modulator having at least a cladding layer, an optical guide layer, an active layer which includes a semiconductor superlattice, the layers being formed on a semiconductor substrate, and a barrier layer formed in the active layer so as to divide the active layer into quantum well layers on opposed sides of the barrier layer, wherein a group of electrons and a group of positive holes, that form excitons, are in said active layer, in a respective one of the quantum well layers of said active layer, and are separate from each other via said barrier layer, said barrier layer consisting of a semiconductor and an insulator or which consists of either one of them, said barrier layer having a thickness so as to avoid recombination of electrons and positive holes of the group of electrons and the group of positive holes, whereby a modulator having stabilized excitons is provided, and means for applying an electric field thereto whereby a mean distance between the group of electrons and the group of positive holes is changed.

2. An optical modulator according to claim 1, wherein said electric field is established by a bias voltage and an electric signal or is established by either one of them.

3. An optical modulator according to claim 1, wherein the barrier layer has a thickness such that said group of electrons and said group of positive holes recombine together via said barrier with a probability of smaller than $10^{-6}$.

4. An optical modulator according to claim 1, wherein each of the quantum well layers in which said group of electrons and said group of positive holes respectively exist is composed of $Ga_{1-x}Al_xAs$ ($0 \leq x < 1$), and said barrier layer is composed of $Ga_{1-y}Al_yAs$ ($0 < y \leq 1$), and wherein $x < y$.

5. An optical modulator according to claim 4, wherein each of said quantum well layers has a thickness of greater than 200 angstroms, and said barrier layer has a thickness of 40 to 100 angstroms.

6. An optical modulator according to claim 1 or 3, wherein each of said quantum well layers is composed of $In_xGa_{1-x}As_yP_{1-y}$ ($0 < x < 1$, $0 < y < 1$), and said barrier layer is composed of InP.

7. An optical modulator according to claim 1 or 3, wherein each of said quantum well layers is composed of $In_xGa_{1-x}As$ ($0 < x < 1$), and said barrier layer is composed of $In_yAl_{1-y}As$ ($0 < y < 1$).

8. An optical modulator according to claim 1, wherein said quantum well layers assume the shape of a stripe.

9. An optical modulator according to claim 1 or 3, wherein said barrier layer has a thickness of from 16 to 199 angstroms.

10. An optical modulator according to claim 1 or 3, wherein said barrier layer has a thickness of from 30 to 1000 angstroms.

11. An optical modulator according to claim 1, wherein each of said quantum well layers has a thickness of 100 to 1000 angstroms.

12. An optical modulator according to claim 11 wherein each of said quantum well layers has a thickness of 300 to 700 angstroms.

13. An optical modulator according to claim 1, wherein the cladding layer and optical guide layer are semiconductor superlattices.

14. An optical modulator according to claim 6, wherein each of said quantum well layers has a thickness of greater than 200 angstroms, and said barrier layer has a thickness of 40 to 100 angstroms.

15. An optical modulator according to claim 7, wherein each of said quantum well layers has a thickness of greater than 200 angstroms, and said barrier layer has a thickness of 40 to 100 angstroms.

16. An optical modulator according to claim 1, wherein the energy band of the barrier layer is such that recombination of the opposed groups of electrons and positive holes, via the barrier layer, is avoided.

17. An optical modulator according to claim 3, wherein the energy band of the barrier layer is such that recombination of the opposed groups of electrons and positive holes, via the barrier layer, is avoided.

18. An optical modulator comprising:
an active layer having at least two well layers of semiconductive material and at least one barrier layer located between two well layers; and
at least one pair of electrodes for applying an electric field to said active layer,
said electric field being applied for modulating light so as to modulate excitons in said active layer, the excitons consisting of electrons and holes, the holes and electrons being located in respective ones of the well layers so that the electrons and holes are separated from each other by said barrier layer, whereby recombination of the holes and electrons is avoided.

19. An optical modulator according to claim 18, wherein adjacent two of said at least two well layers are separated from each other by a barrier layer.

20. An optical modulator according to claim 19, wherein the adjacent well layers on opposite sides of a barrier layer are of semiconductive material of opposite conductivity type to each other.

21. An optical modulator according to claim 20, wherein the barrier layer interposed between adjacent well layers is of undoped semiconductive material.

22. An optical modulator according to claim 18, wherein the at least two well layers and the at least one barrier layer have a stripe shape.

23. An optical modulator according to claim 22, wherein the stripe-shaped well and barrier layers have a high resistivity material provided at the sides thereof.

24. An optical modulator according to claim 18, wherein said active layer includes a plurality of well layers and a plurality of barrier layers, with at least one barrier layer provided between each two adjacent well layers.

25. An optical modulator according to claim 24, wherein the active layer includes four well layers and three barrier layers.

26. An optical modulator according to claim 24, wherein the electrodes are in the form of a ring.

27. An optical modulator according to claim 18, wherein the active layer has two well layers and a barrier layer, the barrier layer being located between the two well layers, and wherein the modulator has one pair of electrodes for applying said electric field.

* * * * *